US008904241B2

(12) United States Patent
Srivastava et al.

(10) Patent No.: US 8,904,241 B2
(45) Date of Patent: Dec. 2, 2014

(54) PROACTIVE AND ADAPTIVE CLOUD MONITORING

(75) Inventors: Deepti Srivastava, San Francisco, CA (US); Andrew Ingham, Romsey (GB); Cheng-Lu Hsu, Sunnyvale, CA (US); Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 518 days.

(21) Appl. No.: 13/192,231

(22) Filed: Jul. 27, 2011

(65) Prior Publication Data

US 2013/0031424 A1    Jan. 31, 2013

(51) Int. Cl.
*G06F 11/00* (2006.01)
*G06F 11/14* (2006.01)
*G06F 11/34* (2006.01)

(52) U.S. Cl.
CPC .......... *G06F 11/008* (2013.01); *G06F 11/1438* (2013.01); *G06F 11/3452* (2013.01); *G06F 11/3409* (2013.01)
USPC .......................... 714/47.3; 714/47.1; 714/47.2

(58) Field of Classification Search
USPC ....................... 714/47.2, 47.3, 47.1
See application file for complete search history.

(56) References Cited

U.S. PATENT DOCUMENTS

| | | | | | |
|---|---|---|---|---|---|
| 5,666,481 | A * | 9/1997 | Lewis | | 714/4.2 |
| 6,006,016 | A * | 12/1999 | Faigon et al. | | 714/48 |
| 6,636,771 | B1 * | 10/2003 | Varma et al. | | 700/79 |
| 6,801,376 | B2 * | 10/2004 | Smith | | 360/31 |
| 7,415,637 | B2 * | 8/2008 | Suzuki et al. | | 714/47.1 |
| 7,634,687 | B2 * | 12/2009 | Haselden et al. | | 714/15 |
| 7,827,446 | B2 * | 11/2010 | Kimura et al. | | 714/43 |
| 7,934,131 | B1 * | 4/2011 | Pinheiro et al. | | 714/43 |
| 8,078,914 | B2 * | 12/2011 | Leeb et al. | | 714/26 |
| 8,244,405 | B2 * | 8/2012 | Kao et al. | | 700/286 |
| 8,433,260 | B2 * | 4/2013 | Kenington et al. | | 455/115.4 |
| 2003/0191606 | A1 * | 10/2003 | Fujiyama et al. | | 702/185 |
| 2004/0073844 | A1 * | 4/2004 | Unkle et al. | | 714/39 |
| 2005/0223302 | A1 * | 10/2005 | Bono | | 714/55 |
| 2006/0242288 | A1 * | 10/2006 | Masurkar | | 709/223 |
| 2008/0174802 | A1 * | 7/2008 | Sampath et al. | | 358/1.13 |

(Continued)

OTHER PUBLICATIONS

"Automatic Performance Statistics" Oracle® Database Performance Tuning Guide 10g Release 2 (10.2) downloaded from the Internet Jun. 13, 2011 http://download.oracle.com/docs/cd/B19306_01/server.102/b14211/auto . . . Copyright 2000 (22 pages).

(Continued)

*Primary Examiner* — Loan L. T. Truong
(74) *Attorney, Agent, or Firm* — Hickman Palermo Truong Becker Bingham Wong LLP

(57) ABSTRACT

Processes, computer-readable media, and machines are disclosed for reducing a likelihood that active functional components fail in a computing system. An active monitoring component receives metrics associated with different active functional components of a computing system. The different active functional components contribute to different functionalities of the system. Based at least in part on the metrics associated with a particular active functional component, the active monitoring component determines that the particular active functional component has reached a likelihood of failure but has not failed. In response to determining that the particular active functional component has reached the likelihood of failure but has not failed, the active monitoring component causes a set of actions that are predicted to reduce the likelihood of failure.

22 Claims, 8 Drawing Sheets

(56) References Cited

U.S. PATENT DOCUMENTS

| | | | |
|---|---|---|---|
| 2008/0228338 A1* | 9/2008 | Howard et al. | 701/29 |
| 2009/0089616 A1* | 4/2009 | Chen et al. | 714/25 |
| 2009/0193298 A1* | 7/2009 | Mukherjee | 714/38 |
| 2009/0222248 A1* | 9/2009 | Grichnik et al. | 703/11 |
| 2010/0201516 A1* | 8/2010 | Gelvin et al. | 340/539.26 |
| 2010/0306588 A1* | 12/2010 | Hamilton et al. | 714/26 |
| 2011/0046842 A1* | 2/2011 | Smith | 701/33 |
| 2011/0208567 A9* | 8/2011 | Roddy et al. | 705/7.41 |
| 2011/0314138 A1* | 12/2011 | Kobayashi et al. | 709/222 |

OTHER PUBLICATIONS

"Diagnosing Performance Problems Using ADDM" Oracle® Database 2 Day D&A 11g Release 1 (11.1) downloaded from the Internet Jun. 13, 2011 http://dowload.oracle.com/docs/cd/B28359_01/server.111/b28301/mon . . . Copyright 2004, 2008 (5 pages).

"Why Use Ion" downloaded from the Internet Jun. 13, 2011 http://www.ion-dba.com/about_ION.htm . . . Copyright 2008-2010 (2 pages).

"Automatic Database Diagnostic Monitor (ADDM") downloaded from the Internet http://www.datadisk.co.uk/html_docs/oracle.addm.htm . . . date unkown (3 pages).

Beautiful Data downloaded from the Internet http://personal.org/oracles-os-watcher-osw-utility/ Copyright 2002-2011 (3 pages).

"Automatic Workload Repository (AWR) in Oracle Database 10g" Database Monitoring downloaded from the Internet http:/www/oracle-base.com/articles/10g/AutomaticWorkloadRepository . . . date unknown (3 pages).

"Automatic Database Diagnostic Monitor (ADDM) in Oracle Database 10g" Database Monitoring downloaded from the Internet http://www/oracle-base.com/articles/10g/AutomaticDatabaseDiagnostic . . . date unknown (3 pages).

"A Troubleshooting the Oracle Clusterware Installation Process" Oracle® Clusterware Installation Guide 11g Release 1 (11.1) for Linux downloaded from the Internet http://download.oracle.com/docds/cd/B28359_01/installa.111/b28263/troub . . . Copyright 2007, 2011 (5 pages).

* cited by examiner

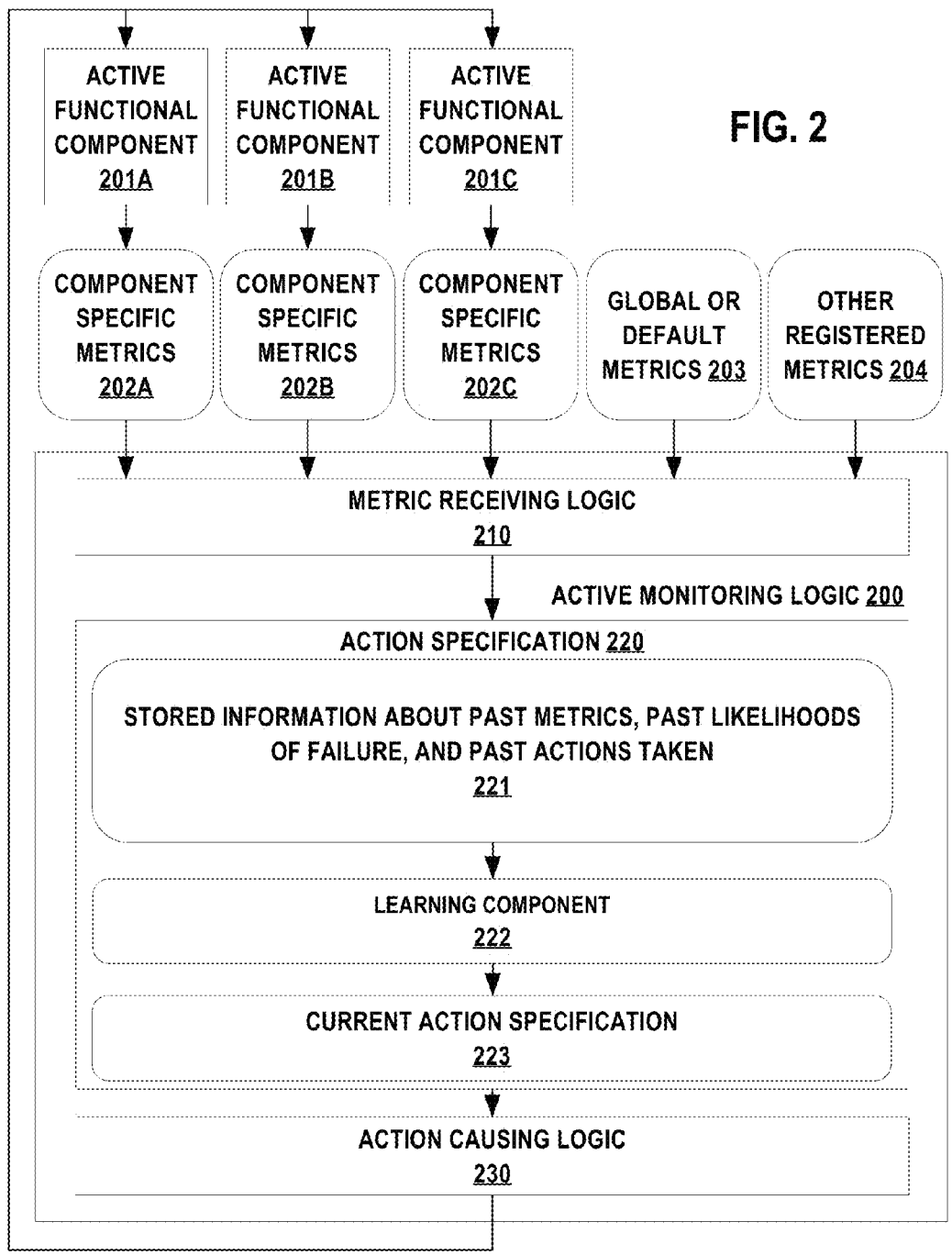

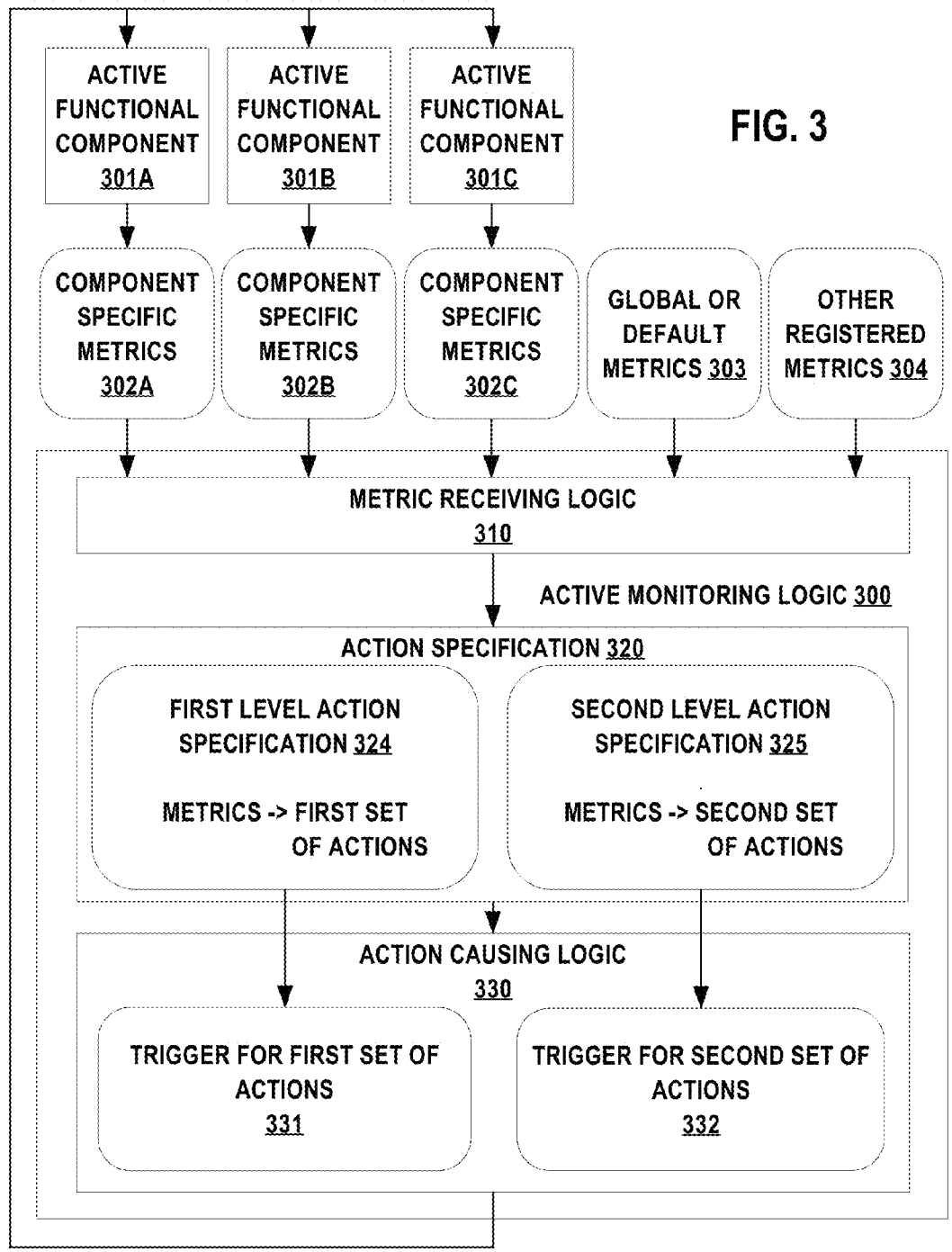

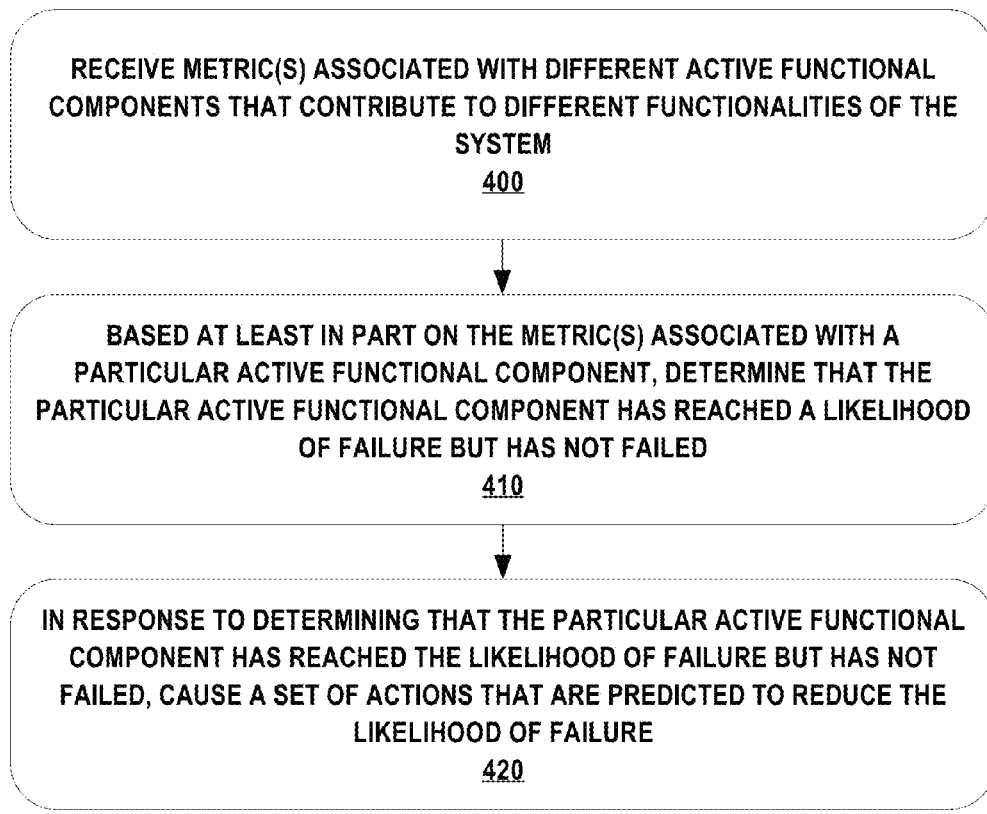

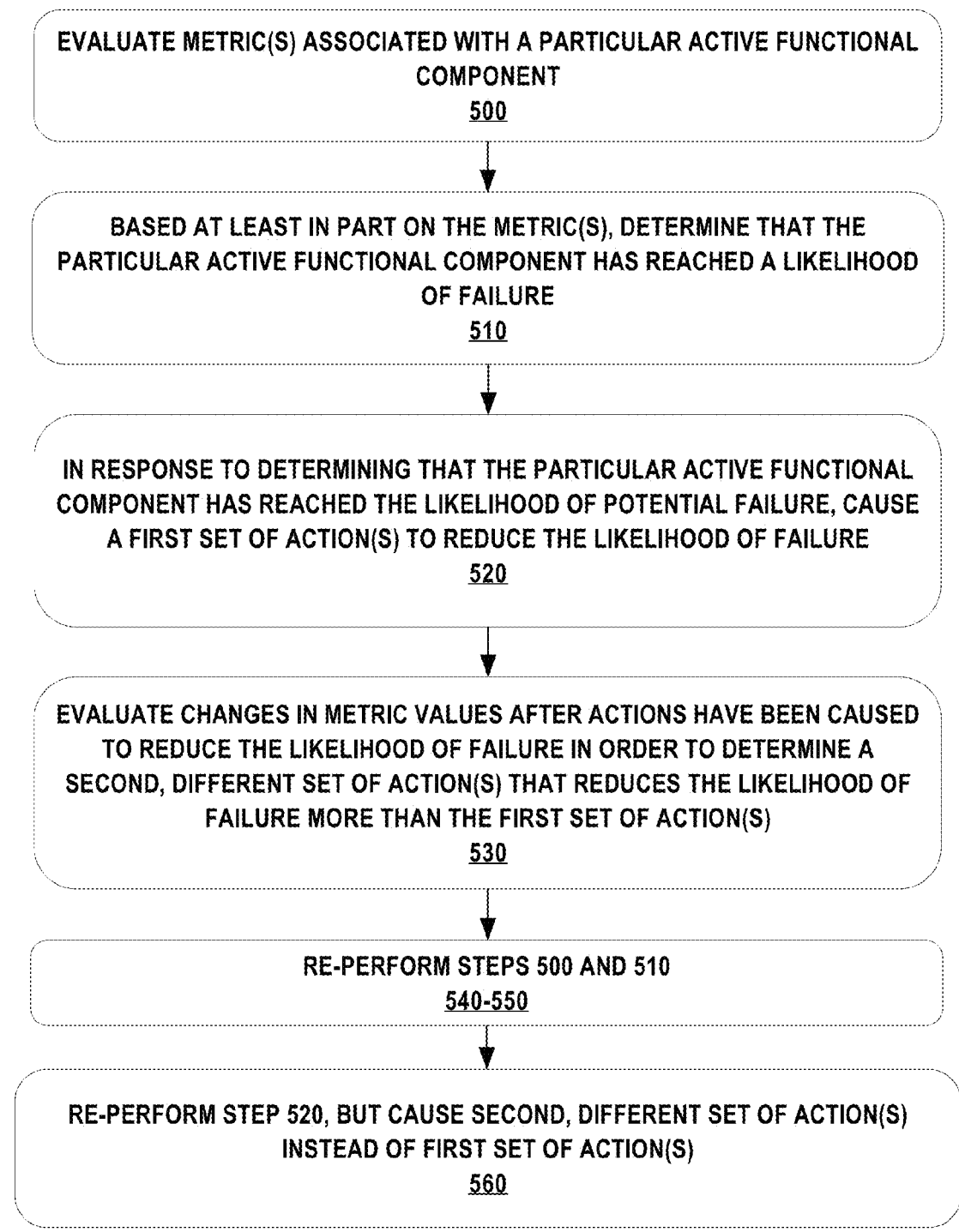

FIG. 6

EVALUATE METRIC(S) ASSOCIATED WITH A PARTICULAR ACTIVE FUNCTIONAL COMPONENT, AND, BASED AT LEAST IN PART ON THE METRIC(S), DETERMINE THAT THE PARTICULAR ACTIVE FUNCTIONAL COMPONENT HAS REACHED A FIRST LIKELIHOOD OF FAILURE
600-610

↓

IN RESPONSE TO DETERMINING THAT THE PARTICULAR ACTIVE FUNCTIONAL COMPONENT HAS REACHED THE FIRST LIKELIHOOD OF FAILURE, CAUSE A FIRST SET OF ACTION(S) TO REDUCE THE FIRST LIKELIHOOD OF FAILURE
620

↓

EVALUATE UPDATED METRIC(S) ASSOCIATED WITH A PARTICULAR ACTIVE FUNCTIONAL COMPONENT, AND, BASED AT LEAST IN PART ON THE METRIC(S), DETERMINE THAT THE PARTICULAR ACTIVE FUNCTIONAL COMPONENT HAS REACHED A SECOND LIKELIHOOD OF FAILURE
640-650

↓

IN RESPONSE TO DETERMINING THAT THE PARTICULAR ACTIVE FUNCTIONAL COMPONENT HAS REACHED THE SECOND LIKELIHOOD OF FAILURE, CAUSE A SECOND, DIFFERENT SET OF ACTION(S) TO REDUCE THE SECOND LIKELIHOOD OF FAILURE
660

US 8,904,241 B2

PROACTIVE AND ADAPTIVE CLOUD MONITORING

CROSS-REFERENCE TO RELATED APPLICATIONS

This application is related to U.S. patent application Ser. No. 12/731,743, filed Mar. 25, 2010, entitled "Improved Metric Correlation And Analysis," the entire contents of which is incorporated by reference herein in its entirety.

FIELD OF THE INVENTION

The present invention relates to reducing a likelihood that active functional components fail in a computing system.

BACKGROUND

Cloud Computing Systems

A cloud or clustered computing system is a computing system that includes a collection of hardware and software components that function together to provide functionality such as, for example, storing data, processing commands, and/or providing services. The system may have several different active functional components that are providing the same functionality in parallel. For example, a cloud storage system may include several different storage devices, optionally with different configurations and from different vendors, operating together to provide a logical storage solution. Underlying logical components of the cloud system may be replaced by different logical components without affecting the overall functionality of the cloud system. The complexity of the cloud system may be hidden from a client of the cloud system, such as a user or application, such that the client may not even need to be aware which software or hardware is being used by the system, as long as the functionality is provided from the system to the client.

To shield the client from the complexities of the cloud, many cloud systems include a client interface and a component interface. The client interface exposes simple commands to the client in the form of an interface such as an application programming interface or a graphical user interface. The commands expose functionality of the cloud system to the client such that, when the cloud system receives commands from the client on the client interface, the cloud system carries out the requested function using a variety of functional components that are optionally hidden from the client. Several clients may be serviced by the cloud system in parallel using parallel instances of the client interface. In many cloud systems, the client interface is provided to the client over a network, and the client reaches the cloud system using an address of a device that is configured to provide service to the client on an instance of the client interface.

Many cloud systems also include a component interface for translating commands received on the client interface into commands that trigger functionality on the underlying components. For example, a command to store an item of data in the cloud may be translated into a command to store an item of data in a particular location on a particular storage device in the cloud. Similarly, a command to retrieve the item may be translated into a command to retrieve the item from the particular location on the particular storage device. In many cloud systems, underlying components are registered with the cloud system as they become available or needed, and commands are sent to the underlying components over a network.

Post-Mortem Analysis of Failure

If a failure causes the cloud or clustered system as a whole to fail, post-mortem analysis techniques analyze statistics associated with operation of the functional components that were active in the system prior to failure. The post-mortem analysis techniques may provide enough information for a system manager to identify the functional component that triggered the failure. The system manager may tune or debug the functional components before restarting the system. For example, the system manager may manually replace, add, remove, re-install, or re-configure hardware and/or software in a system that has failed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 illustrates an example active monitoring logic that includes a learning component for updating action specification that specifies actions for given metrics and metric values.

FIG. 3 illustrates an example active monitoring logic that determines different actions for different metrics and/or different metric values that are predicted or specified to reduce likelihood of failure for a particular active functional component when the particular active functional component is at different levels of potential failure.

FIG. 4 illustrates an example process for causing, before failure of a particular active functional component, a set of actions that are predicted to reduce a likelihood that the particular active functional component fails.

FIG. 5 illustrates an example process for learning and using new specifications of actions for given metrics and metric values.

FIG. 6 illustrates an example process for causing different actions that are predicted to reduce a likelihood that the particular active functional component fails at different levels of potential failure.

DETAILED DESCRIPTION

Figure 1:
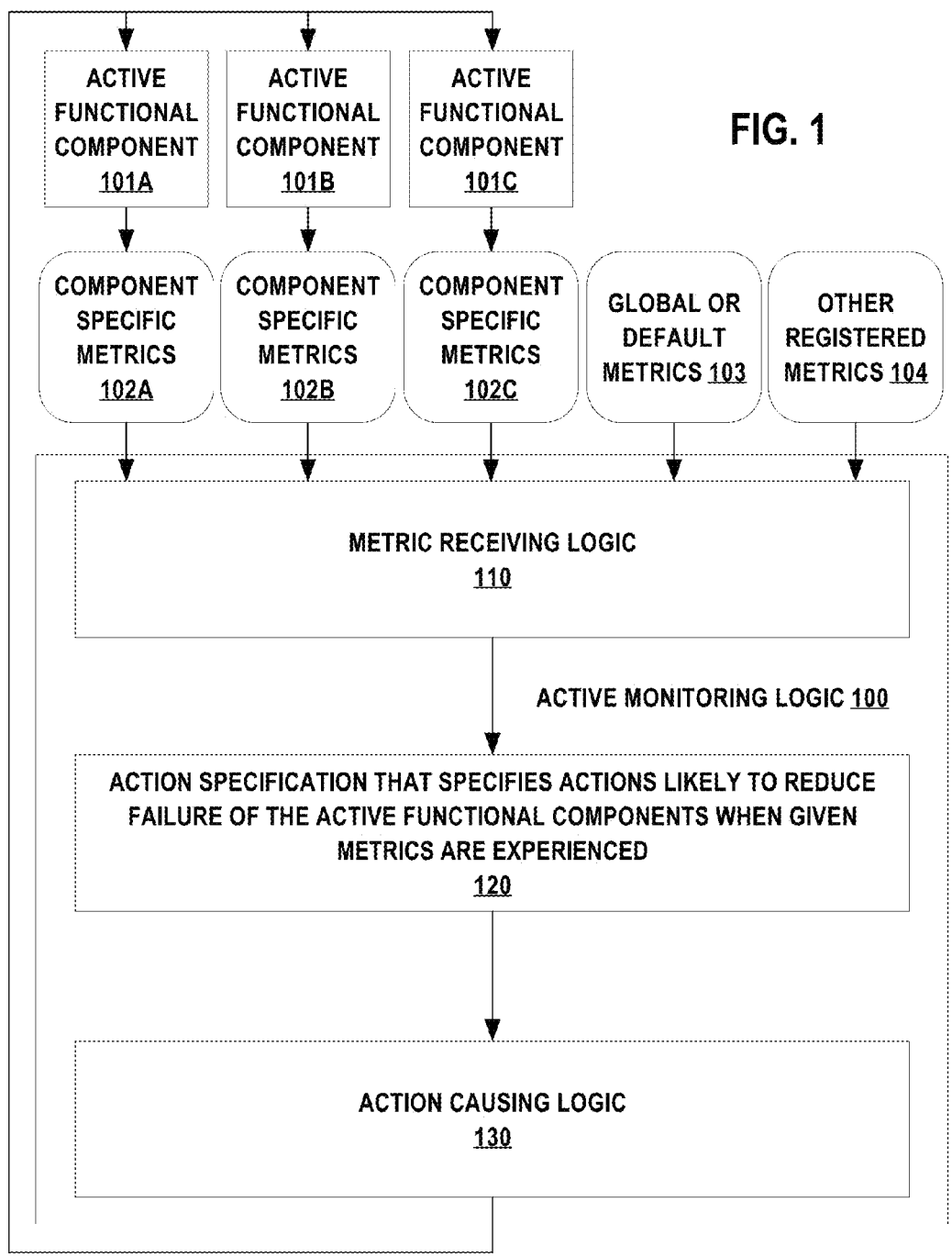
FIG. 1 illustrates an example active monitoring logic that receives metrics, determines actions that are predicted to reduce a likelihood that a particular active functional component fails based on the received metrics and an action specification that specifies actions predicted or specified to reduce likelihood of failure when given metrics are experienced, and causes the actions.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed herein for reducing a likelihood that active functional components fail in a computing system. Although the techniques may be described with reference to specific embodiments, the functionality described herein may be provided by the performance of a set of one or more processes, by a set of one or more stored instructions that, when executed, cause performance of the processes, or by a set of one or more machines specially configured with a combination of hardware and/or software for performing the processes. In one embodiment, an active monitoring component receives metrics associated with different active functional components of a computing system. The different active functional components contribute to different functionalities of the system. Based at least in part on the metrics associated with a particular active functional component, the active monitoring component determines that the particular active functional component has reached a likelihood of failure but has not failed. In response to determining that the particular active functional component has reached the likelihood of failure but has not failed, the active monitoring component causes a set of actions that are predicted to reduce the likelihood of failure.

In one embodiment, the active monitoring component determines that a critical active functional component has reached the likelihood of failure. Failure of the critical active functional component may be likely to cause failure of the system as a whole. In one embodiment, the system cannot operate without the critical active functional component. In response to determining that the critical active functional component has reached the likelihood of failure, the active monitoring component may stop a non-critical active functional component of the system without stopping any critical active functional components or without stopping operation of the system.

In another embodiment, the active monitoring component receives updated metrics associated with the particular active functional component. Based at least in part on the updated metrics, the active monitoring component may determine that the particular active functional component has reached any one of a number of levels or likelihoods of potential failure but has not failed. In response to determining that the particular active functional component has reached another likelihood of failure, the active monitoring component may cause another set of actions that are predicted to reduce the other likelihood that the particular active functional component fails. In one embodiment, a first set of actions is triggered when the particular active functional component reaches a first likelihood of failure, and a second set of actions is triggered when the particular active functional component reaches a second, greater, likelihood of failure. In a further embodiment, actions triggered when the component reaches greater likelihoods of potential failure have a greater risk of causing the system as a whole to fail than actions triggered when the component lower likelihoods of potential failure.

In one embodiment, the active monitoring component evaluates changes in the metrics from a first time to a second time. The active monitoring component may evaluate changes in metric values after actions have been caused to reduce the likelihood of failure of the particular active functional component. In response to evaluating the changes in metric values, the active monitoring component may determine that one set of actions is more likely than another, different set of actions to reduce the likelihood that the particular active functional component fails. In a further embodiment, the active monitoring component may receive updated metrics associated with the particular active functional component, and, based at least in part on the updated metrics, determine that the particular active functional component has again reached the likelihood of failure. In response to determining that the particular active functional component has again reached the likelihood of failure, the active monitoring component may cause the set of actions that is more likely to reduce the likelihood that the particular active functional component fails.

In one embodiment, the active monitoring component may evaluate the metrics by using an action specification that specifies actions for reducing a likelihood of failure of a particular active functional component when certain metrics and/or metric values are detected. The action specification uses metrics and/or metric values to weigh different actions against each other. A first set of metrics and/or metric values may contribute to a first weight of a first set of actions, and a second set of metrics and/or metric values may contribute to a second weight of a second set of actions. The active monitoring component determines which set of actions has a better weight and causes the set of actions that has the better weight.

FIG. 1 illustrates an example active monitoring logic 100 that receives metrics, determines, based on the metrics, actions that are predicted or specified to reduce a likelihood that a particular active functional component fails, and causes the actions. As shown, active functional components 101A-101C report component-specific metrics 102A-102C to metric receiving logic 110 of active monitoring logic 100. Component-specific metrics 102A-102C may include any performance-related measurement taken with respect to active functional components 101A-101C. Metric receiving logic may also receive global or default metrics 103, such as system-wide metrics that are likely to be related to the performance of any active functional component. System-wide metrics may include, for example, operating system metrics, processor usage of the system, memory usage of the system, quantities related to the backlog of commands to be or being processed by the system, or commands that were processed by the system during a particular period of time, wait times for locks, response times of the system, locking information for the system, or network connectivity information for the system. Generally, global or default metrics 103 may include any metrics that active monitoring logic 100 is hard-coded to monitor, or any metrics that active monitoring logic 100 was configured to monitor prior to runtime. Other registered metrics 104 include any metrics that were registered with active monitoring logic 100 during runtime. Active monitoring logic 100 may monitor any information that has been identified as relevant to the performance of any active functional component.

Metrics received by metric receiving logic 110 are used by action specification logic 120 to determine whether any of the received metrics have reached values that are likely to cause failure of the system. Action specification logic 120 may trigger action when a single metric reaches a threshold value, or when a combination of metrics reaches a threshold combination of values. The received metrics may indicate that a particular active functional component of active functional components 101A-101C has reached a level or likelihood of failure but has not failed. For example, active functional component 101A may have three levels of potential failure, with higher levels indicating a higher likelihood of failure. Metrics that satisfy higher levels of potential failure may trigger more extreme or risky actions with respect to the system. For example, a first set of actions may be triggered by action specification logic 120 when the metrics indicate that a particular active functional component is 70% likely to fail, and a different, second set of actions may be triggered by action specification logic 120 when the metrics indicate that the particular active functional component is 80% likely to fail.

As shown, action specification logic 120 uses received metrics of active functional components to determine actions that are likely to reduce failure of active functional components, and action causing logic 130 causes actions with respect to active functional components 101A-101C or (not illustrated) with respect to other functional components, active or inactive, in the system. For example, action causing logic may kill active functional component 101B, which could be a process running in the system. As another example, action causing logic may kill another active functional component that is not being monitored. Alternately, action causing logic may start an active functional component that is not running, or another instance of an active functional component that is already running.

FIG. 4 illustrates an example process for causing, before failure of a particular active functional component, a set of actions that are predicted to reduce a likelihood that the particular active functional component fails. In step 400, the process includes receiving one or more metrics associated with different active functional components that contribute to different functionalities of the system. For example, a first active functional component may be a locking mechanism, and a second active functional component may be a network connection mechanism. Based at least in part on the metric(s) associated with a particular active functional component, in step 410 the process determines that the particular active functional component has reached a likelihood of failure but has not failed. In step 430, the process responds to a determination that the particular active functional component has reached the likelihood of failure by causing a set of actions that are predicted to reduce the likelihood of failure.

Active Functional Components

An active functional component is a hardware or software component, or a mixed hardware and software component, that is currently configured to provide a kind of functionality. Large cloud or clustered computing systems include a variety of active functional components that work together to provide primary and secondary functionality. The primary functionality of a system is any functionality that is required to support basic operation of the system. In other words, the system cannot operate without the primary functionality in place. In one example, the primary functionality includes any functionality that is exposed by the system to the client. In another example, some of the functionality exposed to the client may be considered as optional functionality if the exposed functionality is not central to the purpose of the system.

The secondary functionality of the system includes added optimization features, added efficiency features, restorable features, and other features that, although provided by a healthy system, are not critical to operation of the system at any given time. For example, secondary functionality may include any functionality that is not exposed by the system to the client. In another example, some of the functionality exposed to the client may be considered as optional functionality if the functionality is not central to the purpose of the system.

The primary functionality of the system may be dependent on several different active functional components. An example server may include a request receiving and processing mechanism and an information retrieval or modification mechanism. Without either of these mechanisms, the server is no longer able to operate as a server because the server would not be able to receive requests or carry out the requested functionality. Therefore, these features make up the primary functionality of the server. Each of these features may be dependent on additional features. For example, the server may require a locking mechanism as part of the information retrieval or modification mechanism; or, the server may require a network connection as part of the request receiving and processing mechanism. The primary functionality may differ from system to system; different systems may consider different functionality as critical to the basic operation of the system.

A critical active functional component in a system is a component that contributes to or is critical to the primary functionality of the system. If the critical active functional component fails, then the system as a whole is likely to fail. In the example, the failure of the locking mechanism or the failure of the network connection may cause the failure of the server. In a particular example, failure of a lock monitor process (LMON), a lock monitor daemon process (LMD), or lock monitor services (LMS) could cause failure of an Oracle® Real Application Cluster (RAC). Critical active functional components may differ from system to system, and critical active functional components may be dependent on other components that are critical by virtue of the dependency.

A non-critical active functional component in a system is a component that contributes to the secondary functionality of the system. For example, the failure of a request optimization mechanism may cause the server to process requests in a less than optimal manner. The failure of a temporary storage mechanism may cause the server to retrieve information from a permanent storage mechanism, which may result in slower response times. Although the failure of the temporary storage mechanism may result in the loss of temporary data, the failure of the temporary storage mechanism does not result in the server going offline or crashing. For example, the temporary storage mechanism may hold information that was arranged, selected, or displayed on an interface. Failure of the temporary storage mechanism may result in the loss of information that was displayed on the interface even though failure of the temporary storage mechanism does not cause the system as a whole to fail. Systems that are resistant to failure may have several non-critical active functional components that can be restarted or restored during operation of the system.

A variety of critical and non-critical active functional components work together as a system operates to provide primary and secondary functionality. In large systems, the unplanned failure of non-critical functional components may result in cascading failures of other components, including critical functional components. As a result, the failure of non-critical functional components may cause the system to fail even though the failure of any given non-critical component is typically unlikely to cause such a failure.

Active functional components that support primary and/or secondary functionality may be registered with an active monitoring system. When critical active functional components that support primary functionalities reach a threshold level of potential failure, the active monitoring system may cause failure avoidance actions that are predicted to reduce the likelihood of failure of the critical active functional components. For example, the actions may include killing or destroying non-critical active functional components that could be using resources that are shared by the critical active functional components. The actions may also include starting inactive instances of critical or non-critical functional components.

Metrics

Metrics include any information about a component that may be monitored to determine whether that component, another component, or the system as a whole is likely to fail. Receipt of a single metric about a single component may trigger an action to reduce the likelihood of failure of that component or another component. Alternately, receipt of multiple metrics about a single component or multiple components may trigger an action to reduce the likelihood of failure of a component. The metrics may be general health metrics or statistical metrics. General health metrics include measurements that reflect the health of the system as a whole or a functional component of the system. For example, processor usage information, process heartbeat information, network traffic information, input and/or output information, connection information, and/or memory usage information may relate to the health of the system or a functional component in the system. Statistical metrics include calculations that are made with respect to one or more general health metrics, such as the standard deviation, variation, variability, or derivative or change of a metric.

In one embodiment, metrics are retrieved from an Automatic Workload Repository (AWR) in the Oracle® RAC system. The AWR includes various performance-related statistics, which may be gathered by the monitoring logic by default, without requiring registration of the metrics.

Although various examples of metrics are provided throughout this disclosure, the techniques described herein are not necessarily limited to the specific examples provided. In one example, the metrics associated with a given functional component include any of: a quantity of connections used by the functional component; a quantity of processor cycles used by the functional component; a quantity of memory used by the functional component; a time since a heartbeat message from the functional component; a quantity of active functional components waiting on a same resource as the functional component; an amount of time that a resource, upon which the functional component is waiting, has been locked by another active functional component; a response time of the functional component; and/or a connection quality of the functional component.

In another example, the metrics associated with a given functional component include any of: a quantity of connections used by another active functional component related to the functional component; a quantity of processor cycles used by another active functional component related to the functional component; a quantity of memory used by another active functional component related to the functional component; a time since a heartbeat message from another active functional component related to the functional component; a quantity of active functional components waiting on a same resource as another active functional component related to the functional component; an amount of time that a resource, upon which another active functional component related to the functional component is waiting, has been locked by an active functional component; a response time of another active functional component related to the functional component; and/or a connection quality of another active functional component related to the functional component.

Other examples of metrics include, but are not limited to:

a. average connection rate—Number of user connections made to an instance on average (over a given period of time)
b. current connection rate—The number of connections being made to a given instance currently
c. connection backlog—The backlog of user connections that are still waiting to establish a connection
d. average CPU load—The average load across all CPUs on the machine over a given period of time
e. current CPU load—The current load across all CPUs on the machine
f. runqueue information—On certain platforms, the system load information is reported as the "runqueue length" which is the number of jobs waiting to be scheduled to run on a CPU on the machine.
g. average I/O response—The time for a system I/O to complete, averaged out over a given period of time
h. current I/O response—The time taken to complete an I/O request currently on a given system
i. average network response—The time taken to complete a network request (such as a message send) on the system
j. current network response—The time taken to complete a network request on the system currently
k. task status—The status of a given scheduled task on the system (i.e. running, stopped, suspended, etc.)
l. CPU usage by session—The CPU usage determined at the granularity of individual user sessions.
m. background process status—Status of important processes (such as Oracle DB background processes) as an indicator of system health and/or imminent problems
n. heartbeats—Monitoring the progress of important processes using its "heartbeats"
o. wait history—History of what tasks an important process (that is monitored by this infrastructure) waits for In one embodiment, each metric includes a field, name, and/or type, and a value. Two metrics may be considered to be the same if the metrics are of the same field, name, and/or type and of the same value. Two metrics may be considered to be of the same type but not the same if the metrics have the same field, name, and/or type, but a different value. Different values of metrics may qualify for different levels of potential failure. For example, a first value of a heartbeat metric at a first time may indicate that a process has failed to make progress for the past 5 seconds, and a second value for the heartbeat metric at a second time may indicate that the process has failed to make progress for the past 10 second. In the example, the first value may qualify for a first level or likelihood of potential failure, and the second value may qualify for a second, higher level or likelihood of potential failure. If the critical functional component times out or automatically fails after 15 seconds without progress, then 10 seconds without progress would be highly more likely to result in subsequent failure than 5 seconds without progress. Levels may be separated by various threshold values, and different actions may be triggered at different levels.

Actions

Actions include any process that is predicted to reduce a likelihood that a particular active functional component will fail. A single action may be triggered to reduce the likelihood of failure, or multiple actions may be triggered to reduce the likelihood of failure. Although various examples of metrics are provided throughout this disclosure, the techniques described herein are not necessarily limited to the specific examples provided. In one example, actions include replacing, adding, removing, re-installing, and/or re-configuring hardware and/or software associated with the particular active functional component that is nearing failure or with another active functional component. In another example, the actions include killing one or more processes, increasing a priority of one or more processes, decreasing a priority of one or more processes, rejecting one or more requests for new connections, closing one or more existing connections, starting one or more active functional components, stopping one or more active functional components, de-allocating memory to one or more active functional components, destroying objects used by one or more active functional components, or triggering analysis of metrics other than the one or more metrics.

In a particular example, evaluation of a metric associated with a critical active functional component may indicate that the critical active functional component is in danger of failure. In response to evaluating the metric, active monitoring logic may trigger actions with respect to other critical or non-critical active functional components. For example, the active monitoring logic may kill or destroy non-critical active functional components that could be using resources that are needed by the critical active functional component that is in danger of failure. In one particular example, killing non-critical processes that are hogging processor cycles or network bandwidth may free up processor cycles or network bandwidth for critical processes. In another example, de-allocating memory that was allocated to non-critical processes may free up the memory to be allocated to critical processes. In yet another example, destroying objects or other data created by non-critical processes may free up storage for objects or other data to be stored by critical processes.

The actions may be taken to increase the amount of resources available to the active functional component that is in danger of failure or to other functional components that are related to the active functional component in danger of failure. For example, the actions may start or increase the amount of resources available to other functional components that support the active functional component in danger of failure. The active functional component in danger of failure may be dependent upon instances of the other functional components, and the action may include starting more instances of the other functional components. For example, the action may include making more logical instances of network connections or database connections available to the active functional component that is in danger of failure.

The actions may also decrease the amount of resources available to other active functional components that are either known to support only secondary functionality or are not known to support primary functionality. For example, the actions may include killing or destroying non-critical processes, non-critical objects, or non-critical connections. In a particular example, user processes or foreground processes are killed in order to free up resources for more critical, background processes. As another example, new connections may be throttled for non-critical functional components. The resources freed up by the actions may be made available to the active functional component that is in danger of failure or to other functional components that are related to the active functional component in danger of failure.

When resources of the system become limited, example actions may include, but are not limited to:
    a. Connection throttling—regulate and slow down new and incoming client connections to the servers. This can be achieved via the following techniques:
        i. forced redirection via CLB (client-side load balancers)
        ii. new connection stalling—stalling incoming connections to an already loaded server b. CPU throttling—slow down activities that are CPU-intensive
        i. Suspension of high cost and/or 'luxury' activities
        ii. process priority adjustment—increasing the priority of important processes in the system in order to make sure they are not starved of resources
        iii. Stall processes not holding any resources
        iv. CPU "capping" of foreground processes Other actions for resource shortage and hang scenarios may include, but are not limited to:
    a. Process kill—Kill a process that is hogging up machine resources or holding critical system resources (such as enqueues) and hence blocking other processes from making progress.
    b. Instance suicide—If an instance in a RAC cluster is holding critical resources or is stuck/hung and hence is causing sympathy sickness in the rest of the cluster, then it kills itself to allow others in the cluster to make progress.
    c. Timeout adjustment—Since a RAC cluster is an asynchronous environment, there are various timeouts that govern the performance and responsiveness of the RAC system. The timeouts can be and will be adjusted to prevent drastic actions and allow the system to complete it work if a temporary slowdown is noticed.

In one embodiment, the metrics indicate how many deadlocks are in the system. Deadlocks become increasingly important as they become more prevalent. In one embodiment, the actions include raising a priority of a critical process when the number of deadlocks increases by above a certain percentage, by above a certain amount, to above a certain threshold. The priority of the critical process may be lowered when the number of deadlocks returns decreases by below the certain percentage, by below the certain amount, or to below the certain threshold.

Action Specification

The techniques described herein are not limited to any particular specification of actions that accounts for metrics, and different metrics may be considered to be important or unimportant depending on the system and the monitored active functional components. Active functional components may be registered with the system along with information about the metrics, threshold values, and actions that are suggested for actively monitoring the active functional components. For example, certain non-critical functional components may be known to have a potentially negative effect on certain critical functional components. Upon registering the certain critical functional components, a user, administrator, or developer of the certain critical functional components may register actions to kill or destroy the certain non-critical functional components that are known to the user, administrator, or developer to have a potentially negative effect on the certain critical functional components.

In another example, the registered critical functional components may be known to depend on certain resources or certain other functional components. Accordingly, the registration information for a registered critical functional component may include a negative association with non-critical functional components that are known to tie up the certain resources, or a positive association with the other functional components upon which the registered critical functional component depends. When the registered critical functional component is in danger of failure, the negative associations may indicate that actions should be taken to kill or destroy the non-critical functional components that are known to tie up the certain resources. When the registered critical functional component is in danger of failure, the positive associations may indicate that actions should be taken to create or allocate more resources to instances of the other functional components upon which the registered critical functional component depends. In various embodiments, the creation or allocation of resources to other functional components may be considered less risky to failure of the system as a whole than the killing or destruction of non-critical functional components. Similarly, certain non-critical functional components may be considered less risky to kill or destroy than other non-critical functional components. For example, a non-critical functional component that is known to support only secondary functionality of the system may be killed or destroyed with less risk than a non-critical functional component that is merely not known to support primary functionality of the system.

In one embodiment, the action specification includes stored conditions. An example condition may be "IF A>X AND B<Y, THEN DO Z," for metrics A and B, threshold values X and Y, and action(s) Z. An example condition that depends on only a single metric may be, for example, "IF A>X, THEN DO Z." Conditions may depend on any number of metrics and may even include multiple dependencies on a single metric, such as "IF A>X AND A<Y, THEN DO Z."

Conditions may also be based on a relative change in a metric over time. For example, a condition such as "IF DELTA(A)>X, THEN DO Z" may be based on whether metric A has increased over a threshold amount or over a threshold percentage during a period of time. The condition may also account for other conditions, which may or may not also be based on changes over time. The condition may also specify the amount of time over which a change is relevant to the condition. For example, the condition may be satisfied if metric A has changed over a threshold amount during the past 5 seconds.

Multiple conditions may be stored in association with a single active functional component, and the multiple conditions may trigger different actions based on different metric types and/or different metric values. For example, a first condition, when satisfied, may trigger a first set of actions to reduce a likelihood of failure for the active functional component, and a second condition, when satisfied, may trigger a second, different set of actions to reduce the likelihood of failure for the active functional component. The active functional component may have same or different likelihoods of failure when the different conditions are satisfied. For example, an active functional component may have same or different likelihoods of failure when the overall system processor usage is 95% (an example first condition) and when the active functional component has failed to report a heartbeat for 5 seconds (an example second condition). Same or different actions may be triggered when each of these example conditions are satisfied.

In one embodiment, different specifications are weighed differently based on effectiveness. For example, a first specification of metrics to actions may be assigned a first weight based on the effectiveness of the first specification at reducing the likelihood of failure of the functional component. A second specification of metrics to actions may be assigned a second weight based on the effectiveness of the second specification at reducing the likelihood of failure of the functional component. A specification is selected from the different specifications based at least in part on the weight of each specification, such that the selected specification provides the best likelihood of reducing failure of the functional component.

The specification may be described as a heuristic algorithm that takes results from the metric monitoring logic and, by identifying the most probable cause of poor metric scenarios, uses the metrics to select an appropriate remedial action from an action table.

In one embodiment, the heuristic algorithm maps a combination of failed metrics to their probable root cause(s). For example, the root cause may be identified when the functional component is registered or based on the action that best reduces the likelihood that the functional component fails. Based on the identified cause(s), remedial action(s) are selected. The algorithm tries to search for best matches of cause(s) for a particular set of failed metrics. If best matches are not found, the algorithm chooses the most probable cause or causes for that set of failed metrics.

In one embodiment, the algorithm disambiguates which action should be taken in case more than one set of actions matches the identified cause(s). The disambiguation algorithm makes the final decision on which action should be taken, based on other inputs such as client-provided hints.

Learning New Action Specifications

In one embodiment, an active monitoring component learns new action specifications such that the metric thresholds and specified actions in the new action specifications are more likely to reduce the likelihood of failure of a particular active functional component than metric thresholds and specified actions of previously used action specifications. In one embodiment, the monitoring component evaluates metrics associated with the particular active functional component. Based at least in part on the metrics, the monitoring component automatically determines that the particular active functional component has reached a level of potential failure. In response to determining that the particular active functional component has reached the level of potential failure, the monitoring component automatically causes a first set of actions to reduce a likelihood that the particular active functional component fails. The monitoring component automatically evaluates changes in metric values after actions have been caused to reduce a likelihood that the particular active functional component fails. In response to automatically evaluating the changes in metric values after the actions have been caused, the monitoring component automatically determines a second, different set of actions that reduces the likelihood that the particular active functional component fails more than the first set of actions.

After evaluating the metrics associated with the particular active functional component, optionally after the metrics have exhibited several changes, the active monitoring component re-evaluates the metrics associated with the particular active functional component. In one embodiment, the re-evaluated metrics are the same as the originally evaluated metrics. In response to re-evaluating the same metrics, the monitoring component automatically determines that the particular active functional component has reached the same level of potential failure and automatically causes the second, different set of actions to reduce the likelihood of failure.

In one embodiment, the metric values received, the actions that were caused, and subsequent levels of potential failure that were reached are provided as inputs to a machine learning component. The machine learning component minimizes a likelihood that a particular active functional component fails by, for example, determining which actions, for which metric values, are most likely to result in a subsequent reduction in the likelihood of failure of the particular active functional component.

The techniques described herein are not limited to any particular machine learning technique, and different machine learning techniques may be more useful in different systems. Example machine learning techniques include artificial neural networks, association rule learning, Bayesian networks, clustering, decision tree learning, genetic programming, inductive logic programming, support vector machines, reinforcement learning, and representation learning. These techniques have in common that they all account for certain inputs that have produced certain outputs in the past. The techniques provide a mechanism for maximizing, increasing, or optimizing the output by varying one or more of the inputs. For example, the learning mechanism may be used to vary the actions that are taken in response to the metrics, the threshold values of the metrics that trigger the actions to be taken, and/or the metric fields, names, or types that trigger the actions to be taken. The learning mechanism varies these inputs to increase the probability that the particular active functional component subsequently decreases in likelihood of failure. Another output of the machine learning component may account for the load or burden on the system that is caused by the actions themselves, such that the learning mechanism does not cause the system to be overburdened with failure avoidance actions.

In a particular example, the active monitoring logic may be operating for a particular active functional component according to the condition, "IF A>X AND B<Y, THEN DO Z." The learning component may evaluate the effectiveness of doing Z when A>X and when B<Y. The learning component may vary thresholds X and Y to determine if Z is more effective at other thresholds, vary A and B to determine if Z is more effective for other metrics, and/or vary Z to determine if different actions are more effective for the metrics and thresholds.

As new solutions are learned to avoid failure of different active functional components, root causes may be identified by virtue of the actions that are most successful for a given scenario. For example, if the learning component learns that killing non-critical process B is the best solution to a delayed heartbeat for critical process A, then the system may associate non-critical process B as a negative causal factor for an increase in the likelihood of failure for critical process A.

FIG. 2 illustrates an example active monitoring logic 200 that includes a learning component 222 for updating action specifications that specify actions for different metric conditions. As shown, metric receiving logic 210 receives metrics, and action specification logic 220 determines actions based on metrics. Action specification logic 220 includes stored information about past metrics, past likelihoods of failure, and past actions taken for different active functional components. Learning component 222 uses the past metrics and past actions taken to minimize the likelihood of failure for the different active functional components. Learning component 222 updates current action specifications 223 with new or updated action specifications. The updated action specifications are used to trigger same or different actions than the previously used action specifications 223, and the triggered actions are caused by action causing logic 230. The actions may be caused with respect to active functional components 201A-201C or with respect to other functional components that may or may not be monitored by active monitoring logic 200.

FIG. 5 illustrates an example process for learning and using new action specifications that specify actions based on received metrics. As shown, the process evaluates one or more metrics associated with a particular active functional component in step 500. In step 510, based at least in part on the metric(s), the process determines that the particular active functional component has reached a likelihood of failure. In response to determining that the particular active functional component has reached the likelihood of failure, in step 520, the process causes a first set of one or more actions that are predicted to reduce the likelihood of failure. The process then evaluates, in step 530, changes in metric values after actions have been caused to reduce the likelihood of failure in order to determine a second, different set of one or more actions that is predicted to reduce the likelihood of failure more than the first set of one or more actions. Steps 500 and 510 are then re-performed at a second time, and, in step 560, the second, different set of actions is caused in response to the second time that the particular active functional component reaches the likelihood of failure.

Different Actions at Different Levels of Potential Failure

In one embodiment, an active monitoring component triggers different actions at different levels or likelihoods of potential failure. The monitoring component evaluates metrics associated with a particular active functional component. In response to evaluating the metrics, the monitoring component automatically determines that the particular active functional component has reached a first level of potential failure. At the first level, the monitoring component triggers a first set of actions to reduce the likelihood of failure of the particular active functional component. If the first set of actions is unsuccessful at reducing the likelihood of failure of the particular active functional component, then the particular active functional component may advance to a second level of potential failure. At the second level, the monitoring component triggers a second, different set of actions to reduce the likelihood that the particular active functional component fails. In one embodiment, the second set of actions is riskier than the first set of actions. In other words, the second set of actions may be more likely to cause failure of the system than the first set of actions. For example, the first set of actions may be to kill all processes that are known to be non-critical, and the second set of actions may be to kill processes that are not known to be critical.

FIG. 3 illustrates an example active monitoring logic 300 that specifies different actions based on different metrics and/or different metric values when a particular active functional component is at different levels of potential failure. As shown, action specification logic 320 of active monitoring logic 300 includes first level action specification 324 and second level action specification 325. First level action specification 324 determines a first set of actions based on one or more metrics and/or metric values, and second level action specification 325 a second, different set of actions, based on one or more other metrics and/or other metric values. In one embodiment, the metrics that trigger first level action specification 324 and second level action specification 325 may include metrics that are of the same type but of different values. In a particular example (not illustrated), first level action specification 324 may be triggered when 85% of available memory is used, and second level action specification 325 may be triggered when 95% of available memory is used. First level action specification 324 triggers a first set of actions, which are caused by a trigger for the first set of actions 331 in action causing logic 330. Second level action specification 325 triggers second set of actions 332, which are caused by a trigger for the second set of actions 332 in action causing logic 330.

FIG. 6 illustrates an example process for causing different actions that are predicted to reduce a likelihood that the particular active functional component fails at different levels of potential failure. In steps 600-610, the process evaluates one or more metrics associated with a particular active functional component, and, based at least in part on the metrics, determines that the particular active functional component has reached a first likelihood of failure. In step 620, in response to determining that the particular active functional component has reached the first likelihood of failure, the process causes a first set of one or more actions that are predicted to reduce the first likelihood of failure. The first set of actions may or may not be successful in reducing the first likelihood of failure.

As shown, in steps 640-650, the process further includes evaluating one or more updated metrics associated with the particular active functional component, and, based at least in part on the metrics, determining that the particular active functional component has reached a second likelihood of failure. In response to determining that the particular active functional component has reached the second likelihood of failure, the process causes a second, different set of one or more actions that are predicted to reduce the second likelihood of failure.

Avoiding Sympathy Sickness

Sympathy sickness occurs when a troubleshooting component begins to cause more problems than it solves. Troubleshooting components should be tuned so that they are passive and effective rather than intrusive and therefore ineffective. In one embodiment, sympathy sickness is avoided by killing or destroying a critical active functional component after n attempts to avoid failure of the critical active functional component. Although killing the critical active functional component may result in failure of the system as a whole, killing the critical active functional component at time t is better if the critical active functional component is almost certainly likely to fail at time t+x but has not yet failed at time t. If the active functional component is allowed to continue operating until time t+x, the failure may be cause even more harmful effects than if the active functional component had stopped at time t. Additionally, if the functional component continues operation until failure at t+x, then x represents wasted time that the system or the active functional component could have been using to restart.

Interface

In one embodiment, the process includes receiving, on an interface, registration information for the particular active functional component. The registration information specifies an action specification that includes rules or conditions for determining a set of actions for a particular set of metrics and/or metric values. The action specification or other active action specifications may also map other sets of metrics to other sets of actions. In one embodiment, the interface allows the registration information for the particular active functional component to be updated. The updated registration information may be used to automatically update a default action specification. Before the update, metrics and/or metric values are mapped to a set of failure avoidance actions using the default action specification. After the update, the updated action specification maps the same metrics and/or metric values to another set of failure avoidance actions. If the particular active functional component reaches the level of potential failure at least a first time before the update and a second time after the update, then the active monitoring component may use the default action specification the first time and the updated action specification the second time.

Figure 7:
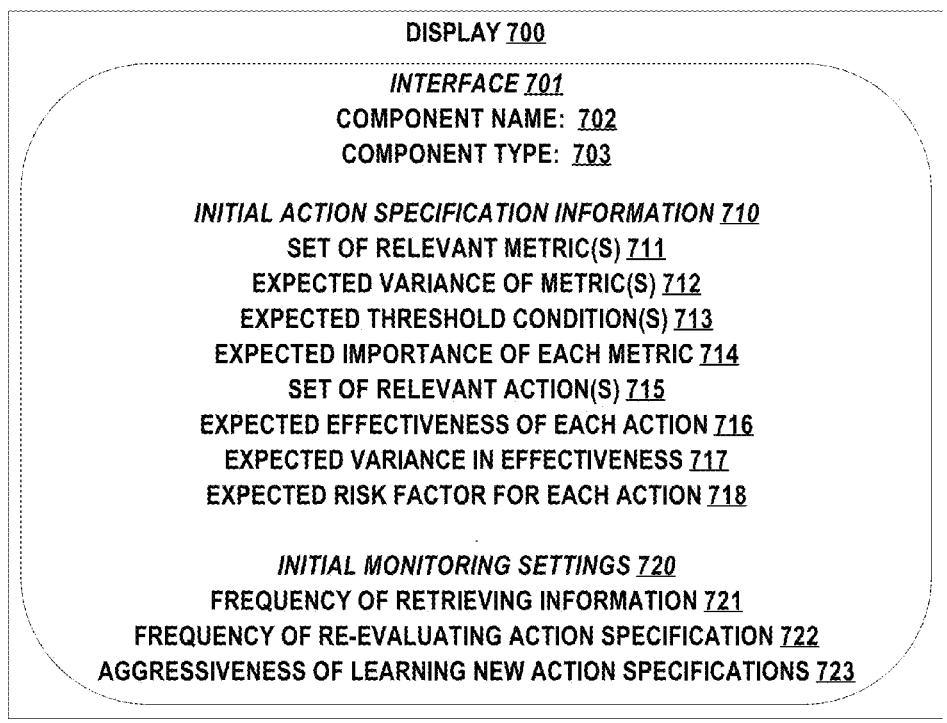
FIG. 7 illustrates an example interface for registering an action specification for a particular functional component.

FIG. 7 illustrates an example interface 701 for registering an action specification for determining actions to reduce likelihood of failure for a particular functional component. As shown, interface 701 is presented on display 700. The interface may be any interface that allows a user, administrator, or developer to input the registration information. The illustrated embodiment shows a graphical user interface, but the registration information inputted into the graphical user interface may equally be inputted via an application programming interface or some other interface.

Interface 701 provides several fields that may be filled in by a user. The illustrated registration information is provided to show an example interface 701, but the techniques described herein do not require any particular item of the illustrated registration information. Component name 702 provides a name of the functional component that the user is registering. The component name may be used to identify the functional component in the monitoring system, and the user may recall a registered functional component to modify the settings registered for that functional component. The component type provides some additional information about the component, beyond the mere name. For example, the component type may specify whether the component is a process, an allocation of memory, an object or structure of data, a storage device, a network connection, a database connection, or any other type of component that contributes to the functionality of the system. Different systems that provide different functionality may have different types of functional components.

Interface 701 also includes initial action specification information 710, which may be static action specification information that can be modified by the user but not learned by the system, or may be merely advisory to a learning component that changes mappings. Initial action specification information 710 includes several items of information that may contribute to action specifications that are based at least in part on metrics. For example, set of relevant metric(s) 711 identifies one or more metrics that may be or are known to be relevant to the functional component. Expected variance of metric(s) 712 may provide an expected variance for each of the relevant metric(s) 711, such that the learning component can determine expected ranges for the relevant metric(s) 711. Expected threshold condition(s) 713 may provide static or merely advisory conditions in which action should be triggered. For example, a threshold condition may be "A>X AND B<Y," or merely "A>X".

The expected importance of each metric 714 may provide the predicted importance that each metric has on the performance of the functional component. In a particular example, the importance may be on a scale of 1-10, with a 10 indicating that the metric is highly indicative of the performance of the functional component and a 1 indicating that the metric is mostly independent of the performance of the functional component. The expected importance 714 may also be positive or negative, with positive values indicating a positive correlation between the metric and performance of the functional component and negative values indicating a negative correlation between the metric and performance of the functional component.

The set of relevant actions 715 may include any actions that may be relevant to reducing likelihood of failure for the functional component, any actions that are suggested for the different threshold conditions 713, or any actions that may be required at the different threshold conditions 713. The set of relevant actions 715 may include calls to actions and parameters to be passed into the calls, and the actions themselves may be defined in a separate list.

The expected effectiveness of each action 716 specifies how likely the action is to reduce likelihood of failure of the functional component, or how much the action is expected to reduce likelihood of failure of the functional component. The expected variance in effectiveness 717 provides guidance to the learning component for measuring effectiveness. The expected risk factor for each action 718 quantifies additional risk that may not be reflected in the other measurements. For example, a particular action may carry a 5% chance of directly causing failure of the system due to a memory exception or some other error associated with the action. The chance of directly causing failure of the system should be considered before causing the actions, regardless of whether or not the action reduces a likelihood of failure of a critical functional component.

Interface 701 also includes initial monitoring information 720, which provides guidance to the active monitoring logic as to how the functional component should be monitored. In addition to the set of relevant metrics 711, the active monitoring logic may need information such as the frequency in which information should be retrieved from the functional component 721. For example, some functional component may report information or progress every 5 seconds, and others may report information or progress every 10 milliseconds.

Initial monitoring information 720 may also include the frequency in which the action specification should be re-evaluated or updated by the learning component 722. Re-evaluating action specifications may be processor-intensive. Also, some action specifications may be more likely to change over time than other action specifications. Therefore, interface 701 may allow the user to specify how frequently the action specification should be re-evaluated for the functional component.

Initial monitoring information 720 may also specify the aggressiveness in which the learning component should learn new action specifications for the functional component 723. The aggressiveness information 723 may give an indication of how much deference should be given to the guidelines provided in initial action specification information 710, as well as how many new metric-threshold-action combinations the learning component should try. If the user registering the functional component is very aware of steps that should be taken to reduce likelihood of failure of the functional component, then the aggressiveness factor 723 may be set as low. If the user registering the functional component knows that the functional component is very important but does not know how to best avoid failure of the functional component, then the aggressiveness factor 723 may be set as high.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
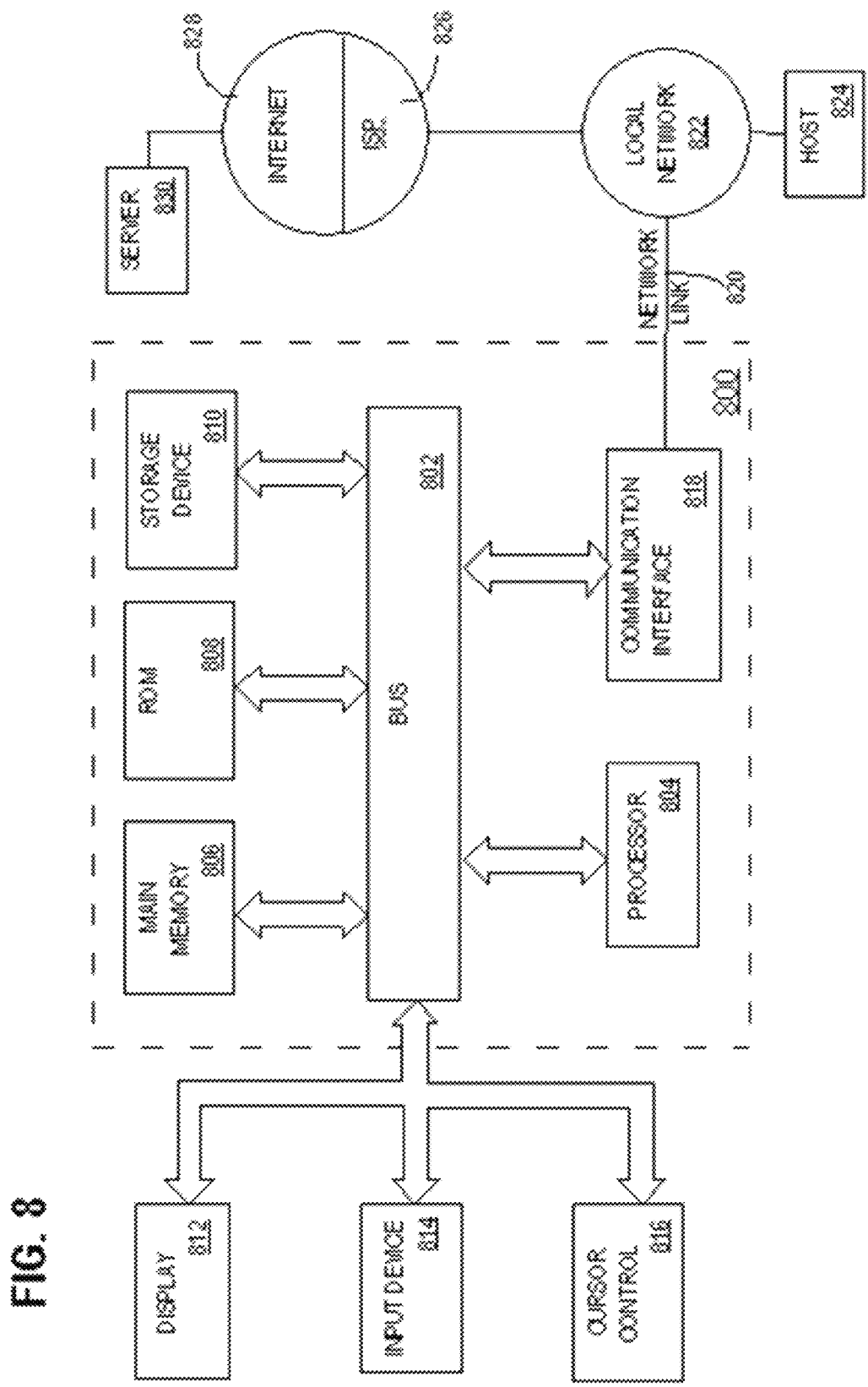
FIG. 8 illustrates an example computer system upon which techniques described herein may be implemented. In some embodiments, several computer systems, which may be similar to the example computer system, operate together in a cloud of computer systems.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A process comprising:
an active monitoring component receiving one or more metrics associated with each of a first active functional component and a second active functional component of a plurality of active functional components of a system, wherein the first active functional component contributes to a different functionality of the system than the second active functional component;
based at least in part on the one or more metrics associated with a particular active functional component of the first active functional component or the second active functional component, the active monitoring component determining that the particular active functional component has reached a likelihood of failure but has not failed;
in response to determining that the particular active functional component has reached the likelihood of failure but has not failed, the active monitoring component causing a set of one or more actions that are predicted to reduce the likelihood of failure;
wherein the likelihood of failure is a first likelihood of failure;
wherein the set of one or more actions is a first set of one or more actions;
the active monitoring component receiving one or more updated metrics associated with the particular active functional component;
based at least in part on the one or more updated metrics associated with the particular active functional component, the active monitoring component determining that the particular active functional component has reached a second likelihood of failure but has not failed, wherein the second likelihood of failure is greater than at the first likelihood of failure;
in response to determining that the particular active functional component has reached the second likelihood of failure, the active monitoring component causing a second set of one or more actions that are predicted to reduce the second likelihood of failure;
wherein, at any given likelihood of failure of the particular active functional component, the second set of one or more actions has a greater risk of causing the system to fail than the first set of one or more actions;
wherein the process is performed by one or more computing devices.

2. The process of claim 1, wherein the set of actions is a first set of actions, the process further comprising:
the active monitoring component evaluating changes in metric values after a plurality of actions are caused, wherein each of the plurality of actions was caused to reduce the likelihood of failure of the particular active functional component;
in response to evaluating the changes in metric values, the active monitoring component determining a second set of one or more actions that is more likely than the first set of one or more actions to reduce the likelihood of failure, wherein the second set of actions is different than the first set of actions.

3. The process of claim 2, further comprising:
the active monitoring component receiving one or more updated metrics associated with the particular active functional component;
based at least in part on the one or more updated metrics associated with the particular active functional component, the active monitoring component determining that the particular active functional component has again reached the likelihood of failure; and
in response to determining that the particular active functional component has again reached the likelihood of failure, the active monitoring component causing the second set of one or more actions to reduce the likelihood of failure.

4. The process of claim 1, wherein the one or more metrics comprise one or more of:
a quantity of connections used by said particular active functional component;
a quantity of processor cycles used by said particular active functional component;
a quantity of memory used by said particular active functional component;
a time since a heartbeat message from said particular active functional component;
a quantity of active functional components waiting on a same resource as said particular active functional component;
an amount of time that a resource, upon which said particular active functional component is waiting, has been locked by another active functional component;
a response time of said particular active functional component; or
a connection quality of said particular active functional component.

5. The process of claim 1, wherein the one or more metrics comprise one or more of:
a quantity of connections used by another active functional component related to said particular active functional component;
a quantity of processor cycles used by another active functional component related to said particular active functional component;
a quantity of memory used by another active functional component related to said particular active functional component;
a time since a heartbeat message from another active functional component related to said particular active functional component;
a quantity of active functional components waiting on a same resource as another active functional component related to said particular active functional component;
an amount of time that a resource, upon which another active functional component related to said particular active functional component is waiting, has been locked by an active functional component;
a response time of another active functional component related to said particular active functional component; or
a connection quality of another active functional component related to said particular active functional component.

6. The process of claim 1, wherein the set of one or more actions comprises one or more of:
killing one or more processes,
increasing a priority of one or more processes,
decreasing a priority of one or more processes, rejecting one or more requests for new connections,
closing one or more existing connections,
starting one or more active functional components,
stopping one or more active functional components, or
triggering analysis of metrics other than the one or more metrics.

7. The process of claim 1, wherein evaluating the one or more metrics comprises evaluating a change in the one or more metrics from a first time to a second time.

8. The process of claim 1, wherein evaluating the one or more metrics comprises evaluating the one or more metrics using an action specification for the particular active functional component, wherein the action specification uses the one or more metrics to weigh the set of one or more actions, wherein the action specification uses one or more other metrics to weigh another set of one or more actions, and wherein the active monitoring component causing the set of one or more actions is in response to determining that the set of one or more actions has a better weight than the other set of one or more actions.

9. The process of claim 1, further comprising receiving, on an interface, registration information for the particular active functional component, wherein the registration information specifies an action specification that maps the one or more metrics to the set of one or more actions, wherein the action specification also maps one or more other metrics to another set of one or more actions.

10. The process of claim 1, further comprising:
receiving, on an interface, updated registration information for the particular active functional component;
using the updated registration information to automatically update a default action specification, wherein, before the update, the default action specification maps the one or more metrics to the set of actions, and wherein the updated action specification maps the one or more metrics to another set of actions;
wherein the particular active functional component reaches the level of potential failure at least a first time before the update and a second time after the update;
the active monitoring component using the default action specification to determine the set of actions to cause in response to the first time that the particular active functional component has reached the level of potential failure, and the active monitoring component using the updated action specification to determine the other set of actions to cause in response to the second time that the particular active functional component has reached the level of potential failure.

11. One or more non-transitory storage media storing instructions which, when executed by one or more computing devices, cause:
an active monitoring component receiving one or more metrics associated with each of a first active functional component and a second active functional component of a plurality of active functional components of a system, wherein the first active functional component contributes to a different functionality of the system than the second active functional component;
based at least in part on the one or more metrics associated with a particular active functional component of the first active functional component or the second active functional component, the active monitoring component determining that the particular active functional component has reached a likelihood of failure but has not failed;
in response to determining that the particular active functional component has reached the likelihood of failure but has not failed, the active monitoring component causing a set of one or more actions that are predicted to reduce the likelihood of failure;
wherein the likelihood of failure is a first likelihood of failure;
wherein the set of one or more actions is a first set of one or more actions;
the active monitoring component receiving one or more updated metrics associated with the particular active functional component;
based at least in part on the one or more updated metrics associated with the particular active functional component, the active monitoring component determining that the particular active functional component has reached a second likelihood of failure but has not failed, wherein the second likelihood of failure is greater than at the first likelihood of failure;
in response to determining that the particular active functional component has reached the second likelihood of failure, the active monitoring component causing a second set of one or more actions that are predicted to reduce the second likelihood of failure;
wherein, at any given likelihood of failure of the particular active functional component, the second set of one or more actions has a greater risk of causing the system to fail than the first set of one or more actions.

12. The one or more non-transitory storage media of claim 11, wherein the set of actions is a first set of actions, wherein the instructions, when executed by one or more computing devices, further cause:
the active monitoring component evaluating changes in metric values after a plurality of actions are caused, wherein each of the plurality of actions was caused to reduce the likelihood of failure of the particular active functional component;
in response to evaluating the changes in metric values, the active monitoring component determining a second set of one or more actions that is more likely than the first set of one or more actions to reduce the likelihood of failure, wherein the second set of actions is different than the first set of actions.

13. The one or more non-transitory storage media of claim 12, wherein the instructions, when executed by one or more computing devices, further cause:
the active monitoring component receiving one or more updated metrics associated with the particular active functional component;
based at least in part on the one or more updated metrics associated with the particular active functional component, the active monitoring component determining that the particular active functional component has again reached the likelihood of failure; and
in response to determining that the particular active functional component has again reached the likelihood of failure, the active monitoring component causing the second set of one or more actions to reduce the likelihood of failure.

14. The one or more non-transitory storage media of claim 11, wherein the one or more metrics comprise one or more of:
a quantity of connections used by said particular active functional component;
a quantity of processor cycles used by said particular active functional component;
a quantity of memory used by said particular active functional component;
a time since a heartbeat message from said particular active functional component;
a quantity of active functional components waiting on a same resource as said particular active functional component;
an amount of time that a resource, upon which said particular active functional component is waiting, has been locked by another active functional component;
a response time of said particular active functional component; or
a connection quality of said particular active functional component.

15. The one or more non-transitory storage media of claim 11, wherein the one or more metrics comprise one or more of:
a quantity of connections used by another active functional component related to said particular active functional component;
a quantity of processor cycles used by another active functional component related to said particular active functional component;
a quantity of memory used by another active functional component related to said particular active functional component;
a time since a heartbeat message from another active functional component related to said particular active functional component;
a quantity of active functional components waiting on a same resource as another active functional component related to said particular active functional component;
an amount of time that a resource, upon which another active functional component related to said particular active functional component is waiting, has been locked by an active functional component;
a response time of another active functional component related to said particular active functional component; or
a connection quality of another active functional component related to said particular active functional component.

16. The one or more non-transitory storage media of claim 11, wherein the set of one or more actions comprises one or more of:
killing one or more processes,
increasing a priority of one or more processes,
decreasing a priority of one or more processes, rejecting one or more requests for new connections,
closing one or more existing connections,
starting one or more active functional components,
stopping one or more active functional components, or
triggering analysis of metrics other than the one or more metrics.

17. The one or more non-transitory storage media of claim 11, wherein the instructions, when executed by one or more computing devices, cause evaluating the one or more metrics by causing evaluating a change in the one or more metrics from a first time to a second time.

18. The one or more non-transitory storage media of claim 11, wherein the instructions, when executed by one or more computing devices, cause evaluating the one or more metrics by causing evaluating the one or more metrics using an action specification for the particular active functional component, wherein the action specification uses the one or more metrics to weigh the set of one or more actions, wherein the action specification uses one or more other metrics to weigh another set of one or more actions, and wherein the instructions, when executed by one or more computing devices, cause the active monitoring component causing the set of one or more actions in response to determining that the set of one or more actions has a better weight than the other set of one or more actions.

19. The one or more non-transitory storage media of claim 11, wherein the instructions, when executed by one or more computing devices, further cause receiving, on an interface, registration information for the particular active functional component, wherein the registration information specifies an action specification that maps the one or more metrics to the set of one or more actions, wherein the action specification also maps one or more other metrics to another set of one or more actions.

20. The one or more non-transitory storage media of claim 11, wherein the instructions, when executed by one or more computing devices, further cause:
    receiving, on an interface, updated registration information for the particular active functional component;
    using the updated registration information to automatically update a default action specification, wherein, before the update, the default action specification maps the one or more metrics to the set of actions, and wherein the updated action specification maps the one or more metrics to another set of actions;
    wherein the particular active functional component reaches the level of potential failure at least a first time before the update and a second time after the update;
    the active monitoring component using the default action specification to determine the set of actions to cause in response to the first time that the particular active functional component has reached the level of potential failure, and the active monitoring component using the updated action specification to determine the other set of actions to cause in response to the second time that the particular active functional component has reached the level of potential failure.

21. The process of claim 1, wherein the particular active functional component is a critical active functional component, wherein the system cannot operate without the critical active functional component, and wherein the set of one or more actions includes stopping a non-critical active functional component of the system without stopping operation of the system.

22. The one or more non-transitory storage media of claim 11, wherein the particular active functional component is a critical active functional component, wherein the system cannot operate without the critical active functional component, and wherein the set of one or more actions includes stopping a non-critical active functional component of the system without stopping operation of the system.

* * * * *

UNITED STATES PATENT AND TRADEMARK OFFICE
CERTIFICATE OF CORRECTION

PATENT NO. : 8,904,241 B2  
APPLICATION NO. : 13/192231  
DATED : December 2, 2014  
INVENTOR(S) : Srivastava et al.

Page 1 of 1

It is certified that error appears in the above-identified patent and that said Letters Patent is hereby corrected as shown below:

On the Title Page

On page 2, column 2, under Other Publications, line 3, delete "unkown" and insert -- unknown --, therefor.

On page 2, column 2, under Other Publications, line 17, delete "docds" and insert -- docs --, therefor.

On page 2, column 2, under Other Publications, line 17, delete "installa." and insert -- install. --, therefor.

Signed and Sealed this  
Fourth Day of August, 2015

Michelle K. Lee  
*Director of the United States Patent and Trademark Office*